US009846841B1

(12) United States Patent
Datta et al.

(10) Patent No.: US 9,846,841 B1
(45) Date of Patent: *Dec. 19, 2017

(54) PREDICTING OBJECT IDENTITY USING AN ENSEMBLE OF PREDICTORS

(71) Applicant: Google Inc., Mountain View, CA (US)

(72) Inventors: Ritendra Datta, Pittsburgh, PA (US); Charles F. Schafer, III, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 1199 days.

This patent is subject to a terminal disclaimer.

(21) Appl. No.: 13/936,451

(22) Filed: Jul. 8, 2013

Related U.S. Application Data (63) Continuation of application No. 12/840,422, filed on Jul. 21, 2010, now Pat. No. 8,484,225.

(60) Provisional application No. 61/227,736, filed on Jul. 22, 2009.

(51) Int. Cl.
*G06F 17/30* (2006.01)
*G06N 5/02* (2006.01)
*G06N 99/00* (2010.01)

(52) U.S. Cl.
CPC ......... *G06N 5/02* (2013.01); *G06F 17/30687* (2013.01); *G06N 99/005* (2013.01)

(58) Field of Classification Search
CPC .............................................. G06F 17/30687
See application file for complete search history.

(56) References Cited

U.S. PATENT DOCUMENTS

| | | | |
|---|---|---|---|
| 6,865,573 B1 | 3/2005 | Hornick et al. | |
| 7,107,204 B1 | 9/2006 | Liu et al. | |
| 7,283,958 B2 | 10/2007 | Azara et al. | |
| 7,599,926 B2 | 10/2009 | Takahashi et al. | |
| 7,953,692 B2 * | 5/2011 | Bower | G06F 17/276 706/18 |
| 2008/0097821 A1 | 4/2008 | Chickering et al. | |
| 2008/0175491 A1 | 7/2008 | Kondo | |

(Continued)

OTHER PUBLICATIONS

Newcombe H.B., et al. "Automatic Linkage of Vital Records". Science, copyright 1959, by the American Association of the Advancement of Science, 130(3381); Oct. 1959, pp. 954-959.

(Continued)

*Primary Examiner* — Grace Park
(74) *Attorney, Agent, or Firm* — Fish & Richardson P.C.

(57) ABSTRACT

Methods, systems, and apparatus, including computer programs encoded on a computer storage medium, for predicting object identity using an ensemble of predictors. In one aspect, a method includes selecting candidate objects that likely match a received object that is to be identified, from a database of objects, and providing attributes of the received object compared with those of the candidates to an ensemble of predictors having respective properties. Based on previous training, each predictor can predict a most likely candidate. From among the most likely candidates, a previously trained support vector machine can select a potential match candidate. If a score that the support vector machine associates with the potential match candidate, that is representative of the potential match candidate's likelihood to match the received candidate satisfies a threshold, then the potential match candidate can be determined to be the received candidate.

20 Claims, 8 Drawing Sheets

(56) References Cited

U.S. PATENT DOCUMENTS

2008/0195571 A1 8/2008 Furuuchi et al.
2008/0294617 A1 11/2008 Chakrabarti et al.
2009/0210371 A1 8/2009 Laan
2009/0248687 A1* 10/2009 Su .................... G06F 17/30533

OTHER PUBLICATIONS

Cohen W.W., "A Comparison of String Metrics for Matching Names and Records" [online]. [Retrieved on Oct. 30, 2012]. Retrieved from Internet electronic mail: http://www.cs.cmu.edu/~pradeepr/papers/kdd03.pdf, 6 pages.
Winkler, W.E. "The State of Record Linkage and Current Research Problems". U.S. Bureau of the Census, Statistical Research Division, [online]. [Retrieved on Oct. 30, 2012]. Retrieved from Internet electronic mail: https://www.census.gov/srd/papers/pdf/rr99-04.pdf, 15 pages.
Fellegi I.P. and Sunter A.B. "A Theory for Record Linkage". J of the American Statistical Association, 64(328), 1969, pp. 1183-1210.

* cited by examiner

PREDICTING OBJECT IDENTITY USING AN ENSEMBLE OF PREDICTORS

CROSS-REFERENCED TO RELATED APPLICATIONS

This Application is a continuation of and claims priority to U.S. application Ser. No. 12/840,422, titled "PREDICTING OBJECT IDENTITY USING AN ENSEMBLE OF PREDICTORS" filed Jul. 21, 2010, which claims the benefit under 35 U.S.C. §119(e) of U.S. Patent Application No. 61/227,736, titled "PREDICTING OBJECT IDENTITY USING AN ENSEMBLE OF PREDICTORS," filed Jul. 22, 2009. The entire contents of each of the foregoing applications are incorporated herein by reference.

BACKGROUND

The present specification relates to identifying matching objects, for example, objects having associated attributes, each of which has a corresponding value.

Object matching refers to matching a received object to one of multiple objects in a database of objects based on one or more attribute values shared by the received object and the matching object in the database. In particular, two objects are defined as matching objects when the two objects are representative of the same product or item.

In managing and searching a database of products, an important matching problem is that of linking individual product offers (i.e., objects that are a description of a product in the form of attributes and uploaded by different merchants) to entries in product databases. Offers that get matched can then be shown in the product pages as part of product search results, which groups all merchants which sell the same product, thereby facilitating price comparison.

This problem is very challenging because, among other reasons, (a) different merchants tend to describe same products differently, as there is no agreed upon standard for describing products, (b) merchants often specify their products incompletely, thereby making it difficult to determine exactly one catalog entry, and (c) product accessories tend to also have very similar descriptions as the parent products, often with only minor differences, thereby leading to ambiguous or incorrect matches.

SUMMARY

In general, one innovative aspect of the subject matter described in this specification can be embodied in methods that include the actions of receiving, by a data processing apparatus, object attribute values identifying attributes of an object, and data identifying a set of first candidates and sets of first candidate attribute values, each of the first candidates in the set of first candidates having a corresponding set of first candidate attribute values, each set of first candidate attribute values identifying attributes of its corresponding first candidate, each of the first candidates having been determined to be a likely match to the object; determining, by the data processing apparatus, object attribute values that match candidate attribute values in each of sets of first candidate attribute values; generating, by the data processing apparatus, a set of candidate/object feature value pairs, each candidate/object feature value being an object attribute value and a matching candidate attribute value; providing, by the data processing apparatus, the set of candidate/object feature value pairs to a plurality of predictors, each predictor configured to predict, for each first candidate, a likelihood that the first candidate matches the object, and respectively rank the first candidates in a respective order so that the plurality of predictors generate respectively ranked sets of first candidates, each respectively ranked set of first candidates ranked according to the likelihoods; determining, by the data processing apparatus, from each of the respectively ranked sets of first candidates, a most likely candidate from among the first candidates in the set, the most likely candidate determined to most likely match the object according to its respective likelihood; and determining, from each of the most likely candidates, a potential match candidate, the potential match candidate being a potential match of a candidate to the object. Other embodiments of this aspect include corresponding systems, apparatus, and computer programs, configured to perform the actions of the methods, encoded on computer storage devices.

Another innovative aspect of the subject matter described in this specification can be embodied in methods that include the actions of identifying by a data processing apparatus a test object having a corresponding set of object attribute values, wherein an object attribute value of the test object is unique such that an identity of the test object is known from the unique object attribute value; identifying by the data processing apparatus sets of training candidates, each of the sets of training candidates including a positive candidate that matches the test object and a plurality of negative candidates that do not match the test object, each candidate in each of the training sets having a corresponding set of training candidate attribute values; and for each set of training candidates: comparing by the data processing apparatus the object attribute values with each set of training candidate attribute values to generate a set of training candidate/object feature value pairs, each training candidate/object feature value pair being an object attribute value and a matching training candidate attribute value, providing by the data processing the set of training candidate/object feature value pairs to a plurality of logistic regression models; training each logistic regression model to predict a likelihood that a candidate matches the object, the training comprising, for each logistic regression model: selecting one of the top K ranked training candidates in the set of candidates; and adjusting one or more model coefficients of the logistic regression model based on the object attributes and the training candidates specified by the set of training candidate/object feature value pairs; wherein the value of K is different for each logistic regression model, and the each selected one of the top K ranked training candidates is a negative candidate.

Particular implementations of the subject matter described in this specification can be implemented to realize one or more of the following advantages. Implementations of the following description can be techniques for high-precision object identification that can be applied in several specific domains, for example, to identify objects offered by merchants for shopping by comparing to a database of objects. Using the techniques described below, useful features of pairs of object attributes can be derived to identify the objects. Further, the techniques can be used to sample data for training a machine learning classifier when the sizes of the different classes of data to be trained are disparate. Furthermore, an ensemble of multiple predictions from multiple predictors can be combined into a single prediction that can yield highly precise predictions. Also, the techniques can be scaled up to match, for example, thousands of objects with millions of objects in databases within short periods of time. Consequently, the techniques can be helpful to solve object matching problems that are encountered in large-scale objects matching environments.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Described are techniques by which a system that includes multiple predictors is trained to predict if an object is present in a database of objects, i.e., if the object matches a candidate object stored in a database of objects. Predictors, e.g., logistic regression models, are provided with feature value pairs that represent attribute values of an object and candidates identified to be a likely match to the object. Each of the predictors predicts a most likely candidates based on a different set of predictor values. From the most likely candidates, a potential match candidate is identified. A support vector machine determines a class probability score for the potential match candidate. If the class probability score satisfies a threshold, then the potential match candidate is determined to match the object.

The predictors are trained to identify most likely candidates using training candidates that are known to include a candidate the matches a training object. The support vector machine is also trained to provide a high probability score to the potential match candidate that matches the object.

Figure 1A:
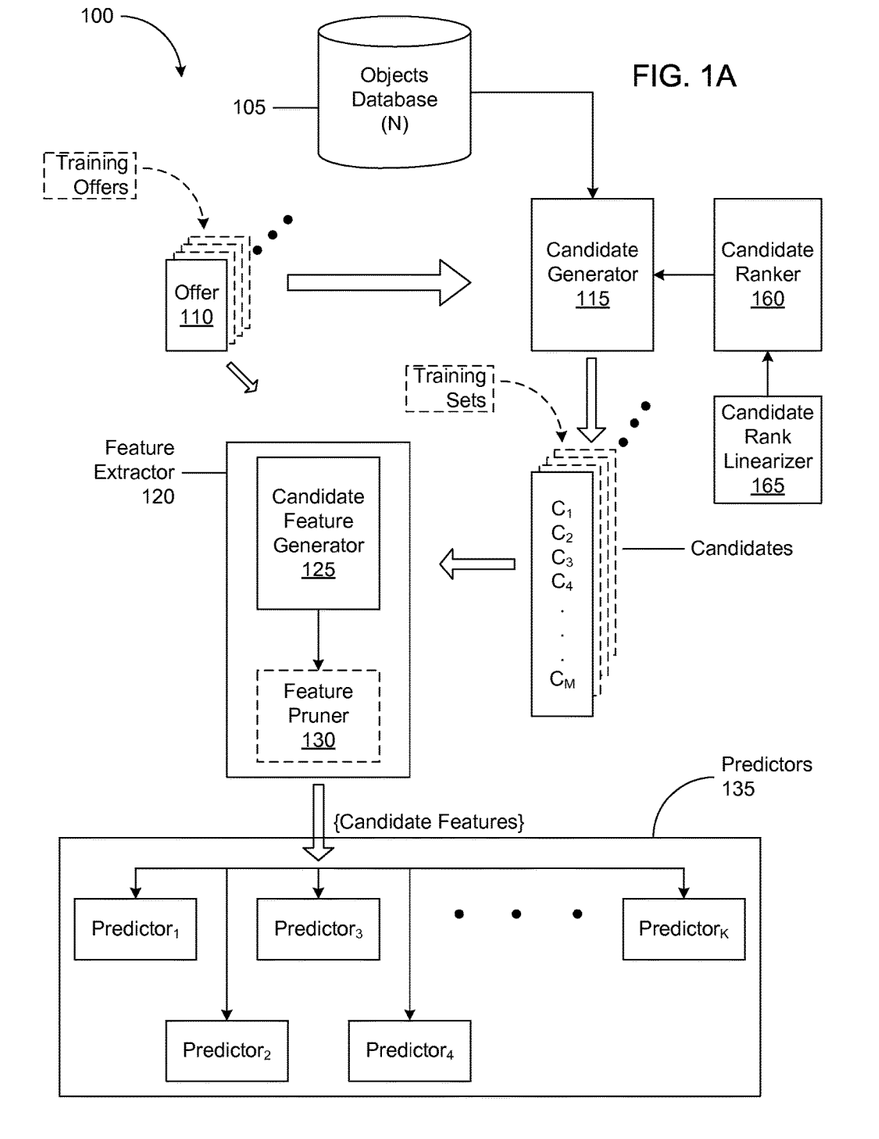
FIGS. 1A and 1B are schematics of an example of a system for predicting object matching using regression techniques.
Figure 1B:
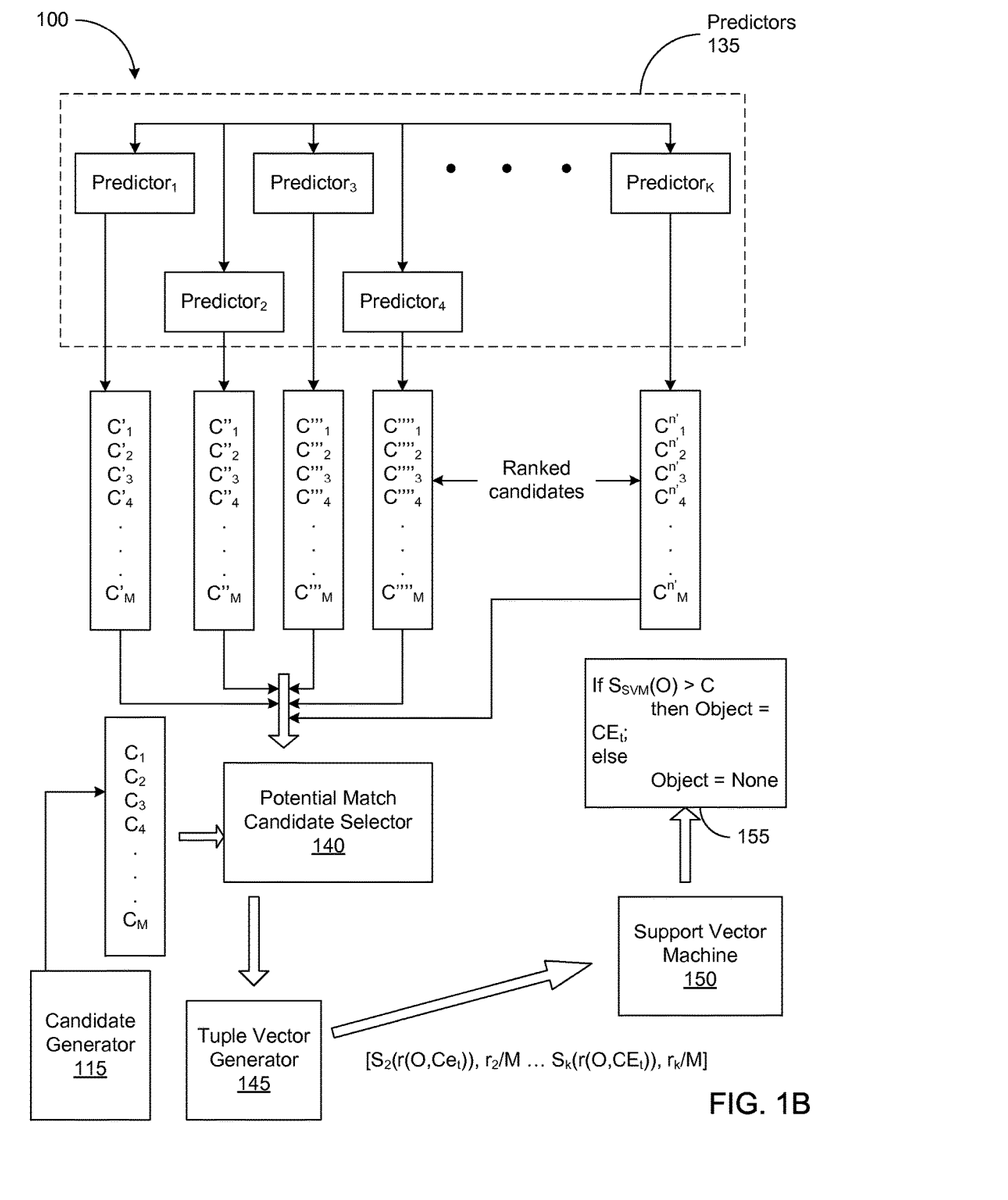

FIGS. 1A and 1B are schematics of an example of a system 100 for predicting object matching using regression techniques. The system 100 includes an objects database 105 including multiple objects, for example, N objects, and attributes for each object. Each object in the database has a corresponding set of attribute values. Each attribute value identifies an attribute of the object. For example, the objects database can be a catalog of products offered for sale by multiple merchants. Example attributes of an object can include "Title," "Description," "Header/Brand," "Model," "Part Number," and the like. The corresponding attribute values can include, for example, "Nike Shox Turbo Running Shoes," "Shoes," "Nike," "Shox Turbo," and the like.

Data for the objects in the objects database 105, and the corresponding attribute values, can be received from providers who make the objects available, for example, for purchase. In some implementations, the objects database 105 is operatively coupled to multiple object providers through one or more networks, for example, the Internet. In such implementations, the object providers can transmit object attributes and corresponding values to the system 100 for storage in the objects database 105. Alternatively, or in addition, the system 100 can crawl web pages of websites on which the object providers make objects available, to gather information about the objects.

In some scenarios, the system 100 receives offers 110 from one or more object providers. Each offer 110 represents an object that is offered by the object provider, attributes associated with the object, and corresponding attribute values. For example, the system 100 can receive an offer 110 to sell a product from a merchant. The offer 110 can include product attributes which can be, for example, "Product name," "Product description," "Manufacturer brand," "Product UPC," and the like, each of which can have a corresponding value. In this manner, the system 100 can receive multiple offers 110 from the same merchant or multiple merchants.

Although both the objects database 105 and the offers 110 include corresponding attributes, in some scenarios, either the attributes or the attribute values or both of objects in the objects database 105 are different from those of objects described by the offers 110. For example, two providers can offer the same object. Data describing the object offered by a first provider can be stored in the objects database 105 while that offered by a second provider can be received in an offer 110. The first provider may include a "Model Number" attribute to describe the object, and the second provider may include a "Part Number" attribute to describe the object. In this manner, attributes provided by the two providers may be different. Also, a name of the object provided by the first provider in a "Title" field may not be an exact match to the name provided by the second provider in a corresponding "Title" field. The system 100 can be configured to predict if an object in the objects database 105 potentially matches the object described in an offer 110 despite the aforementioned differences.

To do so, in some implementations, the system 100 includes a candidate generator 115 that identifies a set of candidates and sets of candidate attribute values for each object described by an offer. Each of the candidates in the set of candidates has a corresponding set of first candidate attribute values. Each set of candidate attribute values identifies attributes of its corresponding candidate. The candidate generator 115 determines from among the candidates in the database 105 a set for first candidates that are a likely match to the object. In some implementations, a number of the candidates identified by the candidate generator 115 can be orders of magnitude fewer, for example, M, than a number of objects in the objects database 105, for example, N, i.e., M<<N.

In some implementations, the candidate generator 110 can generate the set of candidates by using one or more of object attribute values of the object described in the offer 110 to search an index of candidates included in the objects database 105. To do so, in some implementations, the candidate generators 115 can pre-compute inverted indexes based on values of attributes of the object described in the offer 110, for example, the "Title" attribute or the "Universal Product Identifier" attribute. Generally, the candidate generator 115 can employ any function that can filter out objects in the objects database 105 that are unlikely to match the object described by the offer, without excluding the matching object in the database 105 from the candidates selected from the database 105. Examples of other such functions include broad matching on one or more attributes, e.g., the title attribute; price range matching, and product category matching.

In addition, in some implementations, the candidate generator 115 can rank the set of candidates according to a relevance measure of the object attribute values to the candidate attribute values. In such implementations, using a candidate ranker 160, the candidate generator 115 can associate a confidence score to each candidate to quantify the relevance measure. As described later, the confidence score associated to each candidate can assist in predicting a potential match candidate from among the set of candidates. In some implementations, the system 100 can include a candidate rank linearizer 165 to rank the confidence scores into corresponding likelihoods if the confidence scores include scores that are not scaled to unity, i.e., scores that do not range from 0 to 1, with 1 being the highest confidence.

The candidate generator 115 provides the set of candidates and the attribute values to a feature extractor 120 that is configured to extract features over pairs of object attribute values of the object described in the offer 110 and candidate attribute values of each candidate in the set. The feature extractor 120 includes a candidate feature generator 125 that determines object attribute values that match candidate attribute values in each of sets of first candidate attribute values, and generates a set of candidate/object feature value pairs. Each candidate/object feature value pair includes an object attribute value and a matching candidate attribute value.

Figure 6:
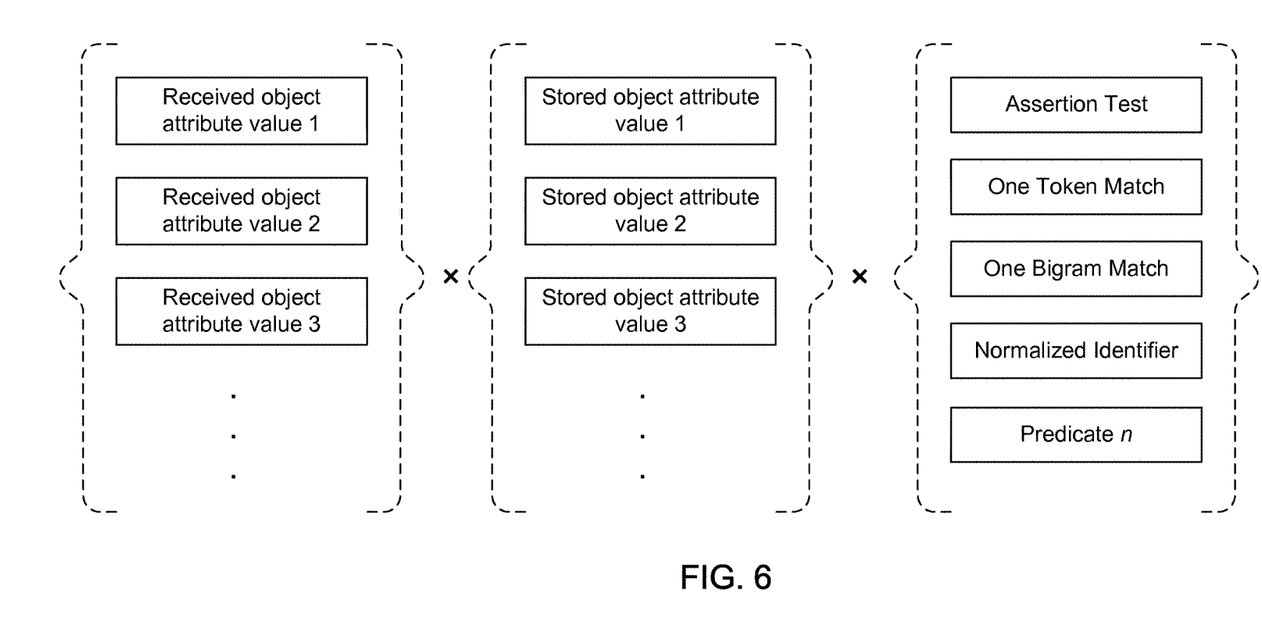
FIG. 6 is a diagram of an example of applying predicates to select feature value pairs.

In some implementations, to generate the set of candidate/object feature value pairs, the candidate feature generator 125 determines a cross product between the attribute values of the object described by the offer 110 and the set of attributes of each candidate in the set of candidates identified by the candidate generator 115. Specifically, the candidate feature generator 125 determines a cross product between each attribute value of the object and each attribute value of each candidate identified by the candidate generator 115. Further, in some implementations, for every candidate/object feature value pair, the candidate feature generator 125 tests a set of predicates, shown in FIG. 6, on the object attribute and the candidate attribute in the candidate/object feature value pair. For example, the predicate "One Bigram Match" holds true over a pair of string values, one each associated with the object attribute and the candidate attribute in the pair, if there is one bigram common between the attribute values. As shown in FIG. 6, the full set of possible feature value pairs is the cross-product of all possible object attribute values, all possible candidate attribute values, and the set of all predicates. In some implementations, the candidate feature generator 125 is designed such that multiple feature generators can be coded independently and implemented. In such implementations, the candidate feature generator 125 can serve as a feature generator controller that combines the features extracted by the individual feature generators, collates, and presents the combined features.

In some implementations, a pruned set of the candidate/object feature value pairs is provided to the predictors 135. The pruned set is determined during a training process that is also used to train the predictors using training offers and training sets, as indicated by the phantom offers and candidate sets. In some implementations, the feature extractor 120 includes a feature pruner 130 used to prune the features on which the predictors are trained, as indicated by the phantom feature pruner 130. The training and pruning process is described in more detail below.

The system 100 includes multiple predictors 135 (Predictor$_1$, Predictor$_2$, Predictor$_3$, Predictor$_4$, . . . , Predictor$_K$) to which the feature extractor 120 provides the set of candidate/object feature value pairs. Each predictor 135 is configured to predict, for each candidate identified by the candidate/object feature value pairs, a likelihood that the candidate matches the object described by the offer 110. Further, each predictor 135 is configured to rank the candidates in a respective order. Thus, the predictors generate respectively ranked sets of candidates. Each candidate is respectively ranked in each ranked set of candidates according to its likelihood as predicted by the corresponding predictor 135.

In some implementations, each predictor 135 is logistic regression model. In such implementations, the feature extractor 120 provides the set of candidate/object feature value pairs to multiple logistic regression models. Each logistic regression model has been previously trained, as described with reference to FIG. 5. The logistic regression models compute probabilities (likelihoods) that candidates provided to the models match the object described by the offer. Based on the computed probabilities, the models rank the candidates. In some implementations, each model ranks the candidates in a decreasing order of likelihoods that the candidates match the object. Alternatively, the models can rank candidates in an increasing order of likelihoods such that the last candidate in the ranked order is most likely to match the object.

The following example that explains the operation of the logistic regression models assumes that there are K models. Logistic regression models estimate a linear model over a set of features, in this case, the set of candidate/object feature value pairs, for the log-odds of the positive class probability. Once the linear model coefficients are estimated, an estimated probability is calculated by taking the feature pairs weighted by the coefficients. Each logistic regression model generates likelihood scores in this manner, and the scores are used to rank the candidates in the candidate set generated by the candidate generator 115.

In some implementations, the system 100 includes five logistic regression models. Other implementations can include more or fewer models. As explained above, each model is configured to rank candidates provided to the model. To do so, each model draws inferences over the set of candidate/object feature value pairs. Given an object described by the offer 110, O, and a set of candidates, $\{CE_0, CE_1, \ldots, CE_{M-1}\}$, provided to a model, for every pair of $\{O, CE_i\}$, the models extract features over the object and candidate attribute values and generates a matching probability/confidence scores, $s_k(r(O, CE_i))$. The probabilities are bounded in the [0, 1] range. Each candidate that is provided to a model is ranked based on the corresponding confidence score assigned to the candidate by the model. Based on the respective ranks of the candidates in the respective orders generated by the logistic regression models, a potential match candidate is identified, as explained below.

As shown in FIG. 1B, the multiple predictors 135 provide corresponding ranked candidates lists. Each predictor identifies a corresponding most likely candidate. As used herein, a most likely candidate for a predictor is a candidate that is ranked the highest by the predictor, i.e., the candidate that the predictor predicts is the most likely to match the object described by the offer 110.

In some implementations, the system 100 includes a potential match candidate selector 140 that determines, from each of the respectively ranked sets of first candidates, based on votes associated with each most likely candidate determined from each of the respectively ranked sets of first candidates. In some implementations, the potential match candidate selector 140 votes on the most likely candidates identified by the predictors 135 to select the potential match candidate. In alternative implementations, the predictors 135 identify and vote on the most likely candidates, and the potential match candidate selector 140 identifies the potential match candidate based on the votes.

In some implementations, the top ranked candidate of each predictor 135 is the most likely candidate according to the predictor and receives one corresponding vote. The potential match candidate selector 140 ranks the most likely candidates according to the votes received by each most likely candidate. In the event of a tie, i.e., two most likely candidates having the same number of votes, the potential match candidate selector 140 resolves the tie by the total sum of confidence scores received by the candidates from each predictor. The topmost candidate, $CE_t$, is chosen to create the hypothesis that $CE_t$ is the potential match candidate that matches the object described by the offer 110.

In some implementations, the potential match candidate selector 140 can also receive as input the list of candidates generated by the candidate generator 115. As the candidate generator 115 ranks the candidates based on a broad match function, the list of candidates generated by the candidate generator may not correspond to likelihoods, i.e., the values that are used to rank the candidates for the candidate generator 115 may not be bounded between 0 and 1. Accordingly, the candidate rank linearizer 165 scales the scores to the range. In some implementations, the scores are linearized according to the function:

$$s(r(O, CE_i)) = \max((1 - \text{rank}(CE_i)/100), 0)$$

The system 100 includes a tuple vector generator 145 configured to create a vector to represent the confidence levels of the individual candidates identified by the predictors 135. In some implementations, the tuple vector generator 145 generates a tuple having the form $(s_K(r(O, CE_t)), r_K/M)$, in which $s_K(r(O, CE_t))$ is a confidence score and $r_k$ is the rank of $CE_t$ for the particular predictor, i.e., predictor$_K$. The tuple vector generator 145 adds this tuple to a decision vector. Similarly, the tuple vector generator 145 generates a tuple for each predictor and adds each tuple to the decision vector. The final decision vector can have the following form:

$$V(O) = [(s_1(r(O, CE_t), r_1/M), \ldots, (s_K(r(O, CE_t), r_K/M)],$$

where K is the number of models. In some implementations, the tuple vector can also include the linearized score and rank corresponding to the candidate list generated by the candidate generator 115.

The system 100 includes a support vector machine 150 configured to determine a class probability score for the potential match candidate. The output of a support vector machine classifier is a distance from a hyperplane separating two classes. Typically, class labels are generated based on which side of the hyperplane a data point resides. To control precision of matching, probability scores are used that are obtained by mapping the distances to probability like values in a [0, 1] range by using a sigmoid function having the following form:

$$\text{Probability score} = \frac{1}{1 + \exp^{-\text{distance from hyperplane}}}$$

The class probability score is based on the likelihoods of the candidates predicted by each predictor, and the respective rank of the potential match candidate in each of the respectively ranked sets of candidates. The class probability score represents a probability that the potential match candidate is a match to the object. The tuple vector generator 145 provides the decision vector to the support vector machine 150, which determines the class probability score represented by $S_{SVM}(O)$. The system 100 further includes a comparator 155 that performs operations described as follows:

If $S_{SVM}(O) > C$
  then, Object=$CE_t$;
else
  Object=none.

Thus, if the comparator 155 determines that the class probability score satisfies the threshold, C, then the system 100 determines that the potential candidate (i.e., $CE_t$) matches the object. In contrast, if the class probability score does not satisfy the threshold, then the system 100 determines that none of the potential candidates match the object. In some implementations, the threshold C can be 0.5. Alternatively, it can be any user-defined value in the [0,1] range.

Thus, using predictors 135 that predict most likely candidates, and optionally the list of candidates generated by the candidate generator 115, the system 100 can identify a potential match candidate and determine if the potential match object matches the object described by an offer 100. In some implementations, the predictors 135 can be trained to predict most likely candidates from which the potential match candidate can be selected.

Figure 2:
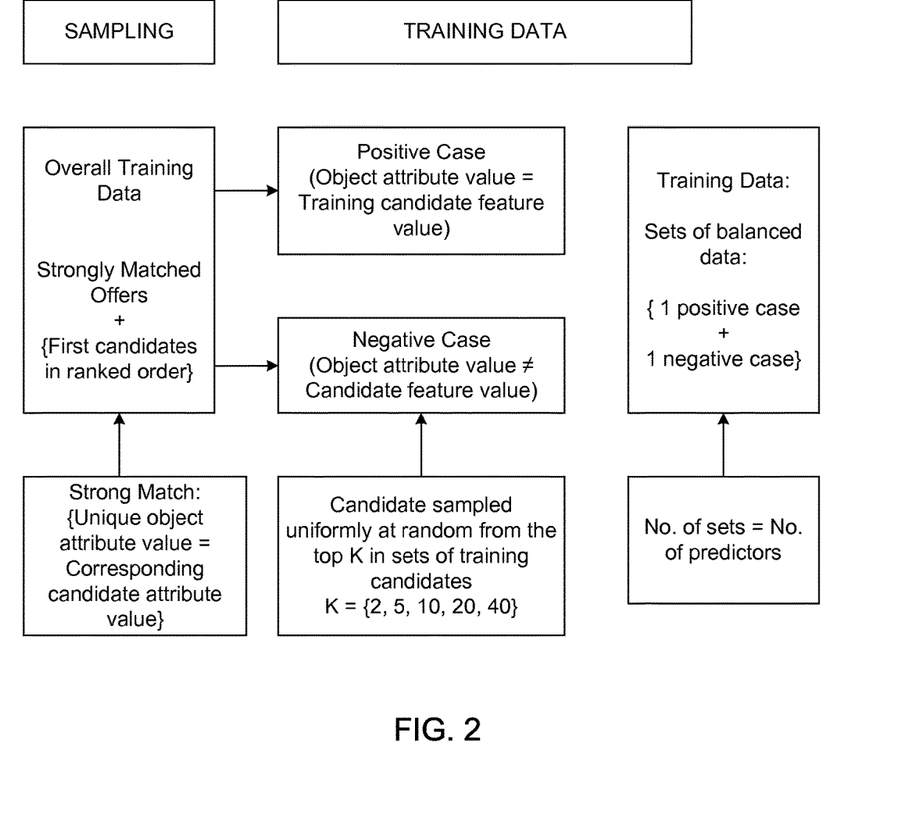
FIG. 2 is a flow diagram of an example of sampling candidate objects and obtaining training data to train a machine to predict object matches.

Techniques for training the predictors 135 are described with reference to FIGS. 2 and 3. FIG. 2 is a flow diagram of an example of sampling candidate objects and obtaining training data to train a machine to predict object identities. In the sampling stage, strongly matched offers are identified from overall training data. The overall training data includes the objects and corresponding attribute values identified by the candidate generator 115 as being most likely to match the object described by an offer 110 and strongly matched candidates. In particular, during the training phase, training offers, in the form of test objects, each having a corresponding set of object attribute values are provided. A test object includes an object attribute value that is unique such that an identity of the test object is known from the unique object attribute value.

For each test object, a set of training candidates is identified by the candidate generator. Each of the sets of training candidates including a positive candidate that matches the test object and a plurality of negative candidates that do not match the test object, and each candidate in each of the training sets having a corresponding set of training candidate attribute values.

In some implementations, the unique attribute for the test object is an error-free Universal Product Code (UPC) in a field identified as a UPC field. Because the test object is identified based on the UPC, there is little to no doubt that the identity of the test object is known. The strongly matched candidate offers included in the overall training data refer to such uniquely identified objects. In some implementations, the strongly matched offers can be identified by a UPC match and a verification. Such a verification can include, for example, a brand verification. The candidate ranker 160 ranks the candidates identified by the candidate generator 115 and the strongly matched offers in a ranked order, as described previously.

Each set of candidates generated by the candidate generator 115 for each test object and used for ranking includes a matching candidate ("positive candidate") and candidates that do not, in fact, match the test object ("negative candidates"). Thus, each set of candidates results in positive cases and negative cases. As used herein, a positive case is a match of an object attribute value of the object to a candidate attribute value of a positive candidate. A negative case is a match of an object attribute value of the object to a candidate attribute value of a negative candidate.

The positive and negative cases are used in a feature pruning process. In some scenarios, the set of the candidate/object feature value pairs generated by the cross-product of FIG. 6 can become large. In some implementations, the feature extractor 120 can include a feature pruner 130 configured to prune the set of candidate/object feature value pairs by decreasing the candidate/object feature value pairs included in the set. To prune the set, the feature pruner 130 can determine that an occurrence of a candidate attribute value in the set of candidate/object feature value pairs satisfies a first threshold, e.g., a feature count X of the feature being present. The feature pruner 130 can also determine that a relative frequency of the first candidate attribute value in a determined set of positive and negative cases of the candidate/object feature value pairs satisfies a second threshold. The relative frequency is a ratio of a greater of the positive cases and the negative cases, and a lesser of the positive cases and the negative cases. Thus, the feature pruner 130 outputs a list of features that passes a minimum threshold on the feature count, and the relative frequency of that feature in the training set of positive and negative cases. The relative frequency is defined by the following ratio:

$$\text{Relative frequency} = \frac{\text{Greater of (\# of positive cases, \# of negative cases)}}{\text{Lesser of (\# of positive cases, \# of negative cases)}}$$

While the first threshold can be specified as an absolute count, the second threshold can be specified by a fraction that is greater than 1.0. For example, if the second threshold is defined as 1.0+specified_flag_value, then the flag value, when set to zero, will not affect feature pruning.

In alternative implementations, the feature pruner 130 is optional such that all pairs in the set are retained for the next step which includes employing multiple predictors to predict most likely candidates from the candidates identified by candidate attribute values in the set of candidate/object feature value pairs.

The final set of pruned features are provided to each of the predictors. For each set of training candidates, each logistic regression model is trained to predict a likelihood that a candidate matches the object. In particular, each logistic regression model selects one of the top K ranked training candidates in the set of candidates, and one or more coefficients of the mode are adjusted based on the object attributes and the training candidates specified by the set of training candidate/object feature value pairs. For the ensemble set of predictors, the value of K is different for each logistic regression model, and each selected training candidate the top K ranked training candidates is a negative candidate.

For example, for a predictor associated with a particular value K, a negative candidate is drawn uniformly at random from the set of candidates identified by the overall training data from among the top ranked K candidates. For example, in systems 100 having five predictors 135, the value of K for each predictor 135 is different, such as K=2, 5, 10, 20, and 40, respectively, for each of the five predictors 135. Subsequently, the object attribute values of the test object are compared with each set of training candidate attribute values to generate a set of training candidate/test object feature value pairs. Each value pair is an object attribute value and a matching training candidate attribute value.

In some implementations, the training data is created by creating five balanced training sets, each including equal number of positive and negative cases, for example, one positive case and one negative case for each K.

Figure 3:
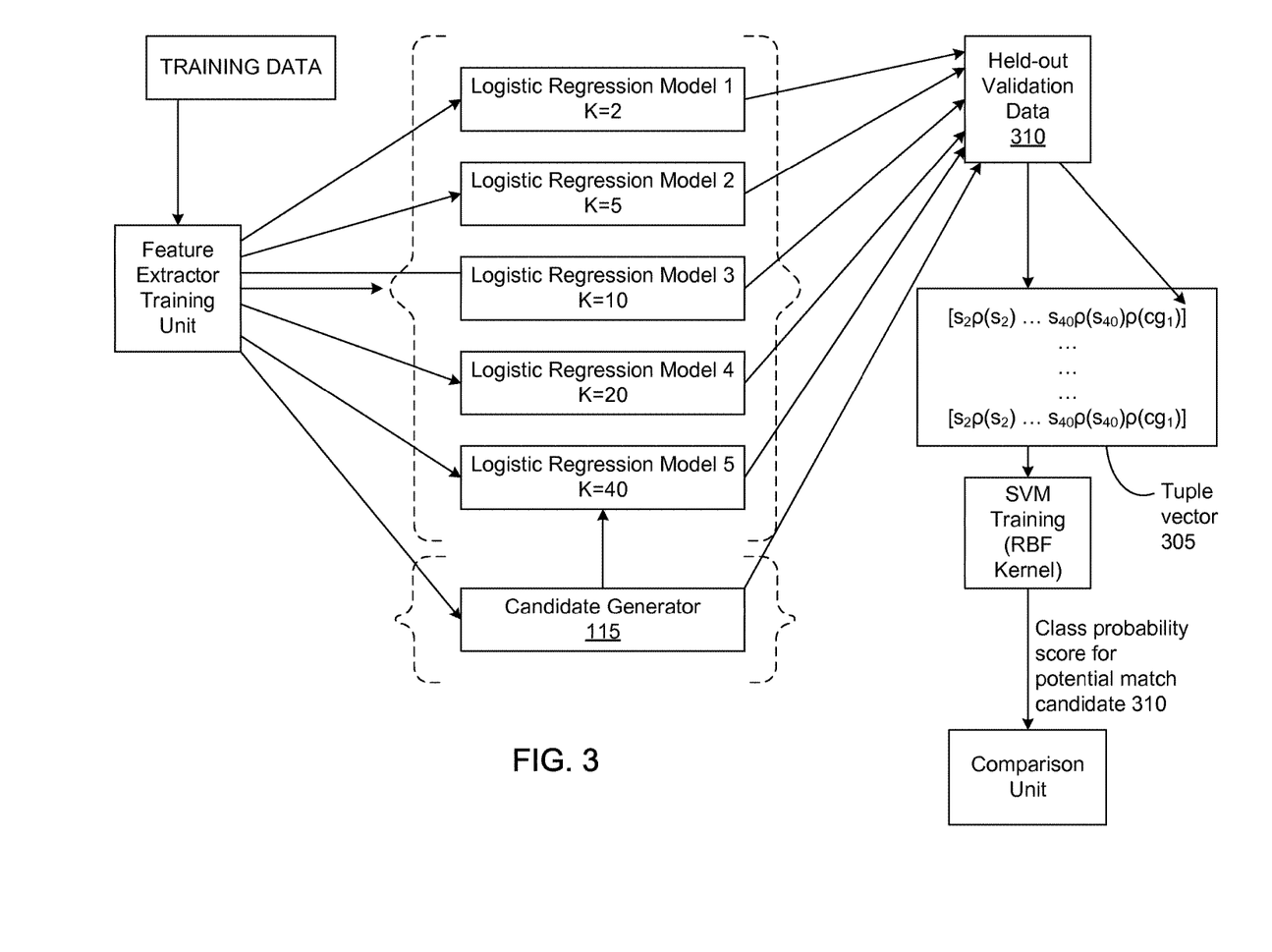
FIG. 3 is a flow diagram of an example of training multiple logistic regression models to predict a potential match candidate object that matches an object.

As shown in FIG. 3, the training data is provided to the multiple predictors operating based on logistic regression models. The total number of candidates in each set of candidates identified by the overall training data and provided to each predictor is the same. However, the number of candidates on which each predictor is trained is different, and is equal to the value of K corresponding to a predictor. For example, each predictor 135 ranks the training candidates in the received set of candidates based on an order, such as a decreasing order, corresponding to a likelihood of the match between the test object and a training candidate. In such scenarios, for each predictor, the top K ranked training candidates is selected in the set of training candidates. For example, in systems 100 having five predictors 135, the value of K for each predictor 135 is K=2, 5, 10, 20, and 40. The model coefficients of each predictor are adjusted based on the test object attributes and the training candidates specified by the set of training candidate/test object feature value pairs for the predictor. For each predictor, to select the top K ranked candidates, the test object, i.e., the matching candidate, included in the set of candidates provided to the predictor is ignored, and the top K ranked candidates are selected from the remaining test candidates.

After the predictors are trained, the ranked sets of candidates from each predictor 135 is used to generate a tuple vector 305, as described previously. In some implementations, the tuple vector is generated using held-out validation data 310 that corresponds to test objects and candidate sets that were not used to train the predictors. The held-out validation data is selected at random and increases the diversity of the data on which the support vector machine is trained. For example, for is K=2, 5, 10, 20, and 40, the tuple vector includes multiple tuples, each tuple represented as shown below:

$$[s_2\rho(s_2) \ldots s_{40}\rho(s_{40})\rho(cg_1)]$$

In each tuple, the subscript corresponds to the predictor K, and the value $s_i\rho(s_i)$ corresponds to the score of a particular candidate for each predictor K. The parameter, $\rho(cg_i)$, is the rank of the corresponding candidate identified by the candidate generator.

In an implementation employing five logistic regression models, eleven parameters are used to generate the tuple vector, i.e., five scores obtained for the candidate of the five models, the ranks of the candidates candidates of each model, and the rank of the candidate in the candidate set generated by the candidate generator.

The tuple vector generated in the above-described manner is provided to train the support vector machine. In some implementations, the support vector machine can operate based on radial bias function (RBF) kernels. In some implementations, the coefficients of the support vector machine can be adjusted for the training data until a comparator determines that class probability score for potential match candidate 310 satisfies a threshold indicating that the potential match candidate is the test object. In this manner, the predictors and the support vector machine of the system 100 can be trained to determine if a potential match candidate selected by the support vector machine based on most likely candidates selected by the predictor match objects received from a provider.

Figure 4:
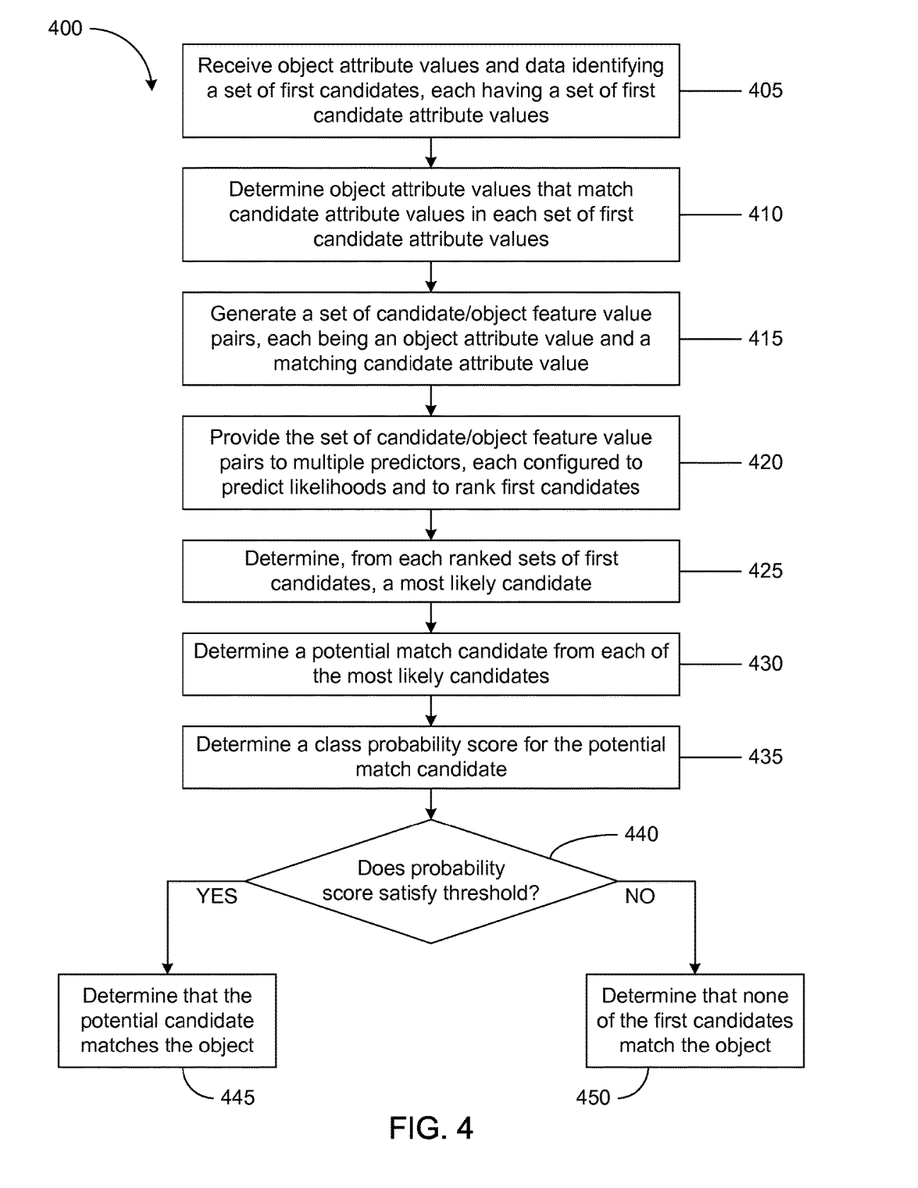
FIG. 4 is a flow chart of an example of a process for predicting an object match.

FIG. 4 is a flow chart of an example of a process 400 for predicting an an object match. The process 400 receives object attribute values and data identifying a set of first candidates, each having a set of first candidate attribute values (405). The process 400 determines object attribute values that match candidate attribute values in each set of first candidate attribute values (410). The process 400 generates a set of candidate/object feature value pairs, each being an object attribute value and a matching candidate attribute value (415). The process 400 provide the set of candidate/object feature value pairs to multiple predictors, each configured to predict likelihoods and to rank first candidates (420). The process 400 determines, from each ranked sets of first candidates, a most likely candidate (425). The process 400 determines a potential match candidate from each of the most likely candidates (430). The process 400 determines a class probability score for the potential match candidate (435). The process 400 checks if the probability score satisfies a threshold (440). If yes, then the process 400 determines that the potential candidate matches the object (445). If no, then the process 400 determines that none of the first candidates match the object (450).

Figure 5:
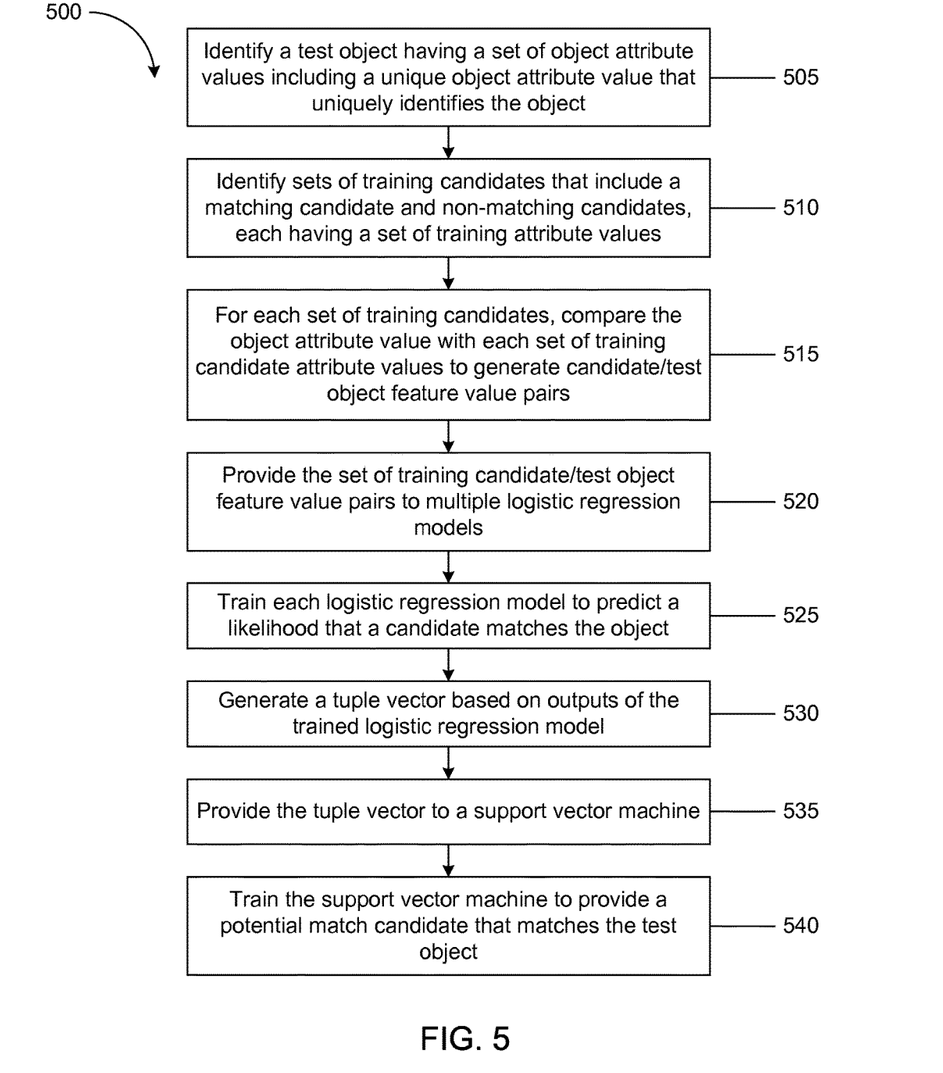
FIG. 5 is a flow chart of an example of a process for training predictors to predict most likely candidates.

FIG. 5 is a flow chart of an example of a process 500 for training predictors to predict most likely candidates. The process 500 identifies a test object having a set of object attribute values including a unique object attribute value that uniquely identifies the object (505). The process 500 identifies sets of training candidates that include a matching candidate and non-matching candidates, each having a set of training attribute values (510). For each set of training candidates, the process 500 compares the object attribute value with each set of training candidate attribute values to generate candidate/test object feature value pairs (515). The process 500 provides the set of training candidate/test object feature value pairs to multiple logistic regression models (520). The process 500 trains each logistic regression model to predict a likelihood that a candidate matches the object (525). The process 500 generates a tuple vector based on outputs of the trained logistic regression model (530). The process 500 provides the tuple vector to a support vector machine (535). The process trains the support vector machine to provide a potential match candidate that matches the test object (540).

FIG. 6 is a diagram of an example of applying predicates to select feature value pairs. To determine a set of candidate/object feature value pairs, a cross-product is determined between a first attribute of a received object (received object attribute value 1) and a first attribute of a stored object (stored object attribute value 1, which is a candidate selected by the candidate generator 115). The cross-product refers to at least partially matching the attribute values of the two attributes using one or more predicates that are each configured to perform different tests to determine probabilities of matches. For example, the tests performed by the predicates include an assertion test, a one token match, a one bigram match, a normalized identifier test, and the like. The candidate/object feature value pairs that are included in the set of value pairs provided to the predictors include those pairs that satisfy a thresholds established by the predicates to indicate a match.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data and receiving user input from a user interacting with the client device). Data generated at the client device (e.g., a result of the user interaction) can be received from the client device at the server.

Figure 7:
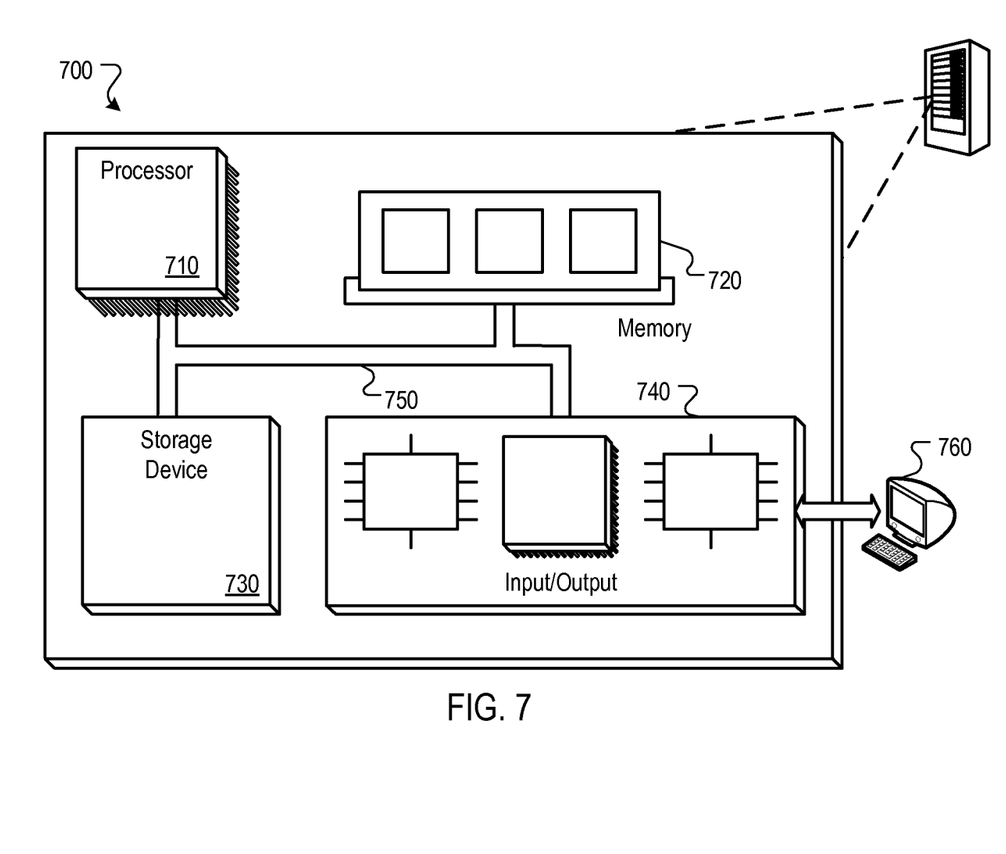
FIG. 7 is a block diagram of a programmable processing system.

An example of a computer in which the above-described techniques can be implemented is shown in FIG. 7, which shows a block diagram of a programmable processing system (system). The system 700 can be utilized to implement the systems and methods described herein. The architecture of the system 700 can, for example, be used to implement a computer client, a computer server, or some other computer device.

The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 760.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the techniques to train the predictors, described above, can be coupled with distance metric learning techniques. Predictors trained by a combination of the above-described techniques and the distance metric learning can be used to identify objects with high precision. In some implementations, a set of feature value pairs other than those described above can be used. The number of predictors can be decreased to one predictor.

What is claimed is:

1. A computer-implemented method, comprising:
    determining, by a data processing apparatus, a potential match candidate from among candidates ranked by predictors, each predictor respectively ranking the candidates according to likelihoods for matching an object as predicted by the respective predictor, and each predictor being different from each other predictor;
    identifying, for each predictor and by the data processing apparatus, a first value that specifies a likelihood of the potential match candidate for matching the object as predicted by the predictor;
    identifying, for each predictor and by the data processing apparatus, a second value that is proportional to the ranking of the potential match candidate as predicted by the predictor;
    determining, by the data processing apparatus, a class probability score for the potential match candidate using the first value for each predictor and the second value for each predictor, the class probability score representing a probability that the potential match candidate is a match to the object;
    determining, by the data processing apparatus, that the class probability score satisfies a threshold; and
    determining, by the data processing apparatus, that the potential match candidate matches the object in response to determining that the class probability score satisfies the threshold.

2. The method of claim 1, wherein determining the class probability score for the potential match candidate comprises:
    generating a tuple for each predictor, each tuple including the first value and the second value for the tuple's corresponding predictor;
    generating a tuple vector that includes each tuple; and
    providing the tuple vector to a support vector machine, wherein the support vector machine determines the class probability score using the tuple vector.

3. The method of claim 1, further comprising:
    identifying, for each predictor, a most likely candidate based on the ranking of the candidates as predicted by the predictor;
    determining a number of votes for each most likely candidate, the number of votes for a particular most likely candidate specifying the number of predictors for which the particular most likely candidate was identified as the most likely candidate for the predictor; and
    selecting the potential match candidate as the most likely candidate that has the most number of votes.

4. The method of claim 1, wherein identifying the first value for a predictor comprises:
    receiving object attribute values identifying attributes of the object;
    receiving candidate attribute values for each candidate, the candidate attribute values for each candidate identifying attributes of the candidate;
    generating a set of candidate/object feature value pairs, each candidate/object feature value pair including an object attribute value and a matching candidate attribute value;
    providing the set of candidate/object feature value pairs to the predictor; and
    receiving, from the predictor, the first value for the predictor.

5. The method of claim 1, wherein identifying the second value for a predictor comprises:
    receiving object attribute values identifying attributes of the object;
    receiving candidate attribute values for each candidate, the candidate attribute values for each candidate identifying attributes of the candidate;
    generating a set of candidate/object feature value pairs, each candidate/object feature value pair including an object attribute value and a matching candidate attribute value; and
    providing the set of candidate/object feature value pairs to the predictor; and
    receiving, from the predictor, the ranking of the candidates as predicted by the predictor; and
    identifying the second value based on the ranking of the potential match candidate as predicted by the predictor.

6. The method of claim 1, wherein each predictor comprises a linear regression model.

7. The method of claim 1, further comprising training the predictors, each predictor being trained using a different number of training candidates.

8. A system, comprising:
    a data processing apparatus; and
    a memory storage apparatus in data communication with the data processing apparatus, the memory storage apparatus storing instructions executable by the data processing apparatus and that upon such execution cause the data processing apparatus to perform operations comprising:
        determining, by the data processing apparatus, a potential match candidate from among candidates ranked by predictors, each predictor respectively ranking the candidates according to likelihoods for matching an object as predicted by the respective predictor, and each predictor being different from each other predictor;

identifying, for each predictor and by the data processing apparatus, a first value that specifies a likelihood of the potential match candidate for matching the object as predicted by the predictor;
identifying, for each predictor and by the data processing apparatus, a second value that is proportional to the ranking of the potential match candidate as predicted by the predictor;
determining, by the data processing apparatus, a class probability score for the potential match candidate using the first value for each predictor and the second value for each predictor, the class probability score representing a probability that the potential match candidate is a match to the object;
determining, by the data processing apparatus, that the class probability score satisfies a threshold; and
determining, by the data processing apparatus, that the potential match candidate matches the object in response to determining that the class probability score satisfies the threshold.

9. The system of claim 8, wherein determining the class probability score for the potential match candidate comprises:
generating a tuple for each predictor, each tuple including the first value and the second value for the tuple's corresponding predictor;
generating a tuple vector that includes each tuple; and
providing the tuple vector to a support vector machine, wherein the support vector machine determines the class probability score using the tuple vector.

10. The system of claim 8, wherein the instructions upon execution cause the data processing apparatus to perform further operations comprising:
identifying, for each predictor, a most likely candidate based on the ranking of the candidates as predicted by the predictor;
determining a number of votes for each most likely candidate, the number of votes for a particular most likely candidate specifying the number of predictors for which the particular most likely candidate was identified as the most likely candidate for the predictor; and
selecting the potential match candidate as the most likely candidate that has the most number of votes.

11. The system of claim 8, wherein identifying the first value for a predictor comprises:
receiving object attribute values identifying attributes of the object;
receiving candidate attribute values for each candidate, the candidate attribute values for each candidate identifying attributes of the candidate;
generating a set of candidate/object feature value pairs, each candidate/object feature value pair including an object attribute value and a matching candidate attribute value;
providing the set of candidate/object feature value pairs to the predictor; and
receiving, from the predictor, the first value for the predictor.

12. The system of claim 8, wherein identifying the second value for a predictor comprises:
receiving object attribute values identifying attributes of the object;
receiving candidate attribute values for each candidate, the candidate attribute values for each candidate identifying attributes of the candidate;
generating a set of candidate/object feature value pairs, each candidate/object feature value pair including an object attribute value and a matching candidate attribute value; and
providing the set of candidate/object feature value pairs to the predictor; and
receiving, from the predictor, the ranking of the candidates as predicted by the predictor; and
identifying the second value based on the ranking of the potential match candidate as predicted by the predictor.

13. The system of claim 8, wherein the instructions upon execution cause the data processing apparatus to perform further operations comprising training the predictors, each predictor being trained using a different number of training candidates.

14. A computer storage medium encoded with a computer program, the program comprising instructions that when executed by a data processing apparatus cause the data processing apparatus to perform operations comprising:
determining, by the data processing apparatus, a potential match candidate from among candidates ranked by predictors, each predictor respectively ranking the candidates according to likelihoods for matching an object as predicted by the respective predictor, and each predictor being different from each other predictor;
identifying, for each predictor and by the data processing apparatus, a first value that specifies a likelihood of the potential match candidate for matching the object as predicted by the predictor;
identifying, for each predictor and by the data processing apparatus, a second value that is proportional to the ranking of the potential match candidate as predicted by the predictor;
determining, by the data processing apparatus, a class probability score for the potential match candidate using the first value for each predictor and the second value for each predictor, the class probability score representing a probability that the potential match candidate is a match to the object;
determining, by the data processing apparatus, that the class probability score satisfies a threshold; and
determining, by the data processing apparatus, that the potential match candidate matches the object in response to determining that the class probability score satisfies the threshold.

15. A computer-implemented method comprising:
identifying, by a data processing apparatus, a test object having a corresponding set of object attribute values;
identifying, by the data processing apparatus, sets of training candidates, each candidate in each of the sets of training candidates having a corresponding set of training candidate attribute values; and
for each set of training candidates:
identifying a set of training candidate/object feature value pairs, each training candidate/object feature value pair being an object attribute value and a matching training candidate attribute value,
providing, by the data processing apparatus, the set of training candidate/object feature value pairs to a plurality of models;
training each model to predict a likelihood that a candidate matches the test object, the training comprising, for each model:
identifying K training candidates for the model; and
adjusting one or more model coefficients of the model based on the object attributes and the training candidates specified by the set of training candidate/object feature value pairs that correspond to the identified K training candidates for the model;
wherein the value of K is different for each model.

16. The method of claim 15, wherein training each model to predict a likelihood that a candidate matches the test object further comprises:
ranking the training candidates in a decreasing order based on a likelihood that each training candidate matches the test object; and
selecting the top K ranked training candidates.

17. The method of claim 15, wherein each of the sets of training candidates include a positive candidate that matches the test object and a plurality of negative candidates that do not match the test object.

18. The method of claim 15, wherein each of the K training candidates is a negative candidate that does not match the test object.

19. The method of claim 15, further comprising pruning the set of training candidate/object feature value pairs to form a pruned set of training candidate/object feature value pairs by decreasing the training candidate/object feature value pairs included in the set, wherein the pruning includes:

determining by the data processing apparatus that an occurrence of a test candidate attribute value in the set of training candidate/object feature value pairs satisfies a first threshold;
determining by the data processing apparatus that a relative frequency of the test candidate attribute value in a determined set of positive and negative cases of the test candidate/object feature value pairs satisfies a second threshold; and
keeping the candidate/object feature value pair corresponding to the test candidate attribute value in the set of training candidate/object feature value pairs in response to determining that the occurrence satisfies the first threshold and the relative frequency satisfies the second threshold.

20. The method of claim 19, further comprising providing the pruned set of training candidate/object feature value pairs to the plurality of models and wherein training each logistic regression model to predict a likelihood that a candidate matches the test object comprises training each model only on the pruned set of training candidate/object feature value pairs.

* * * * *